Patented Feb. 29, 1944

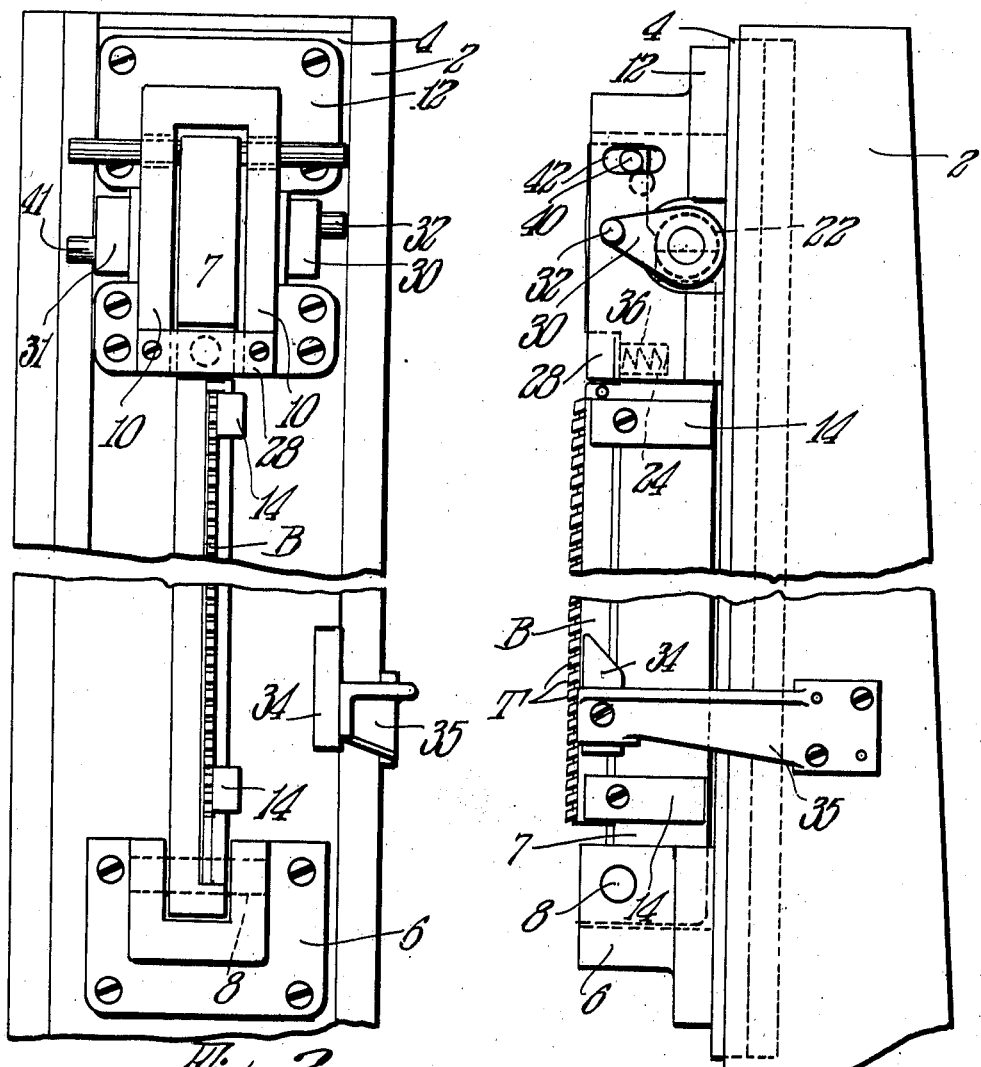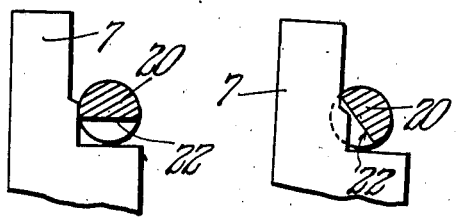

2,342,686

UNITED STATES PATENT OFFICE 2,342,686

BROACHING MACHINE

John Oakley, Springfield, Mass., assignor to Perkins Machine and Gear Company, West Springfield, Mass., a corporation of Massachusetts Application July 6, 1942, Serial No. 449,911

4 Claims. (Cl. 90—33)

This invention relates to improvements in broaching apparatus.

The principal objects of the invention are directed to the provision, in broaching apparatus wherein the broach is reciprocated back and forth, of means to move the broach away from or out of the work for and during the return or non-working stroke of the broach relative to the work. Particularly the invention relates to broaching apparatus and operations where high speed and accuracy is desired and necessary.

The invention is especially adapted where a broach tool is reciprocated relative to the work being broached and performs the broaching operation as it is pulled rather than pushed. A broaching operation where the broach tool is pulled through or past the work is preferred to an operation where the broach is pushed since the operation may be performed with greater speed and accuracy and with less strain on the work and broach.

According to this invention the broach tool is supported in a carrier that is pivoted at its lower end in the reciprocating means in such a way that on termination of the pulling work stroke the broach is instantly swung away from and out of contact with the work so that it may be quickly returned for a subsequent pulling work stroke. The rapidity with which the broach may be swung away from the work since the necessary movement thereof is relatively small in order to clear the work makes it possible to operate at high speed.

It has been customary in broaching operations to move the work away from the broach for the return stroke of the broach but the mechanism therefor is necessarily cumbersome and heavy and has had much to do with slowing down broach operations. In applicant's case the broach carrier is readily swingable, it is not excessively heavy and the actuating parts therefor may be simple in construction and efficient in operation so as to obtain the desired speed of operation.

With the foregoing and various other novel features and advantages and other objects of my invention as will become more apparent as the description proceeds, the invention consists in certain novel features of construction and in the combination and arrangement of parts as will be hereinafter more particularly pointed out in the claims hereunto annexed and more fully described and referred to in connection with the accompanying drawing wherein:

Fig. 1 is a side elevational view of a broaching apparatus having the novel features of the invention associated therewith;

Fig. 2 is a front elevational view of the apparatus shown in Fig. 1;

Figs. 3 and 4 are diagrammatic sectional views showing the broach carrier and operating means in different relative positions; and Fig. 5 is a side elevational view of the carrier operating means.

Referring now to the drawing in detail, the novel features of the invention will be more fully described.

A support is represented by 2 in which a slide 4 is suitably guided for reciprocation. In the drawing, the parts are arranged for reciprocation of the slide in a vertical plane but it may reciprocate in any other plane as well.

Any suitable means may be employed for reciprocating the slide and being no part of the present invention the same is not shown. It is desired that the slide be pulled rather than pushed during the cutting stroke of the broaching tool or tools to be reciprocated by the slide.

A bracket 6 is secured to the lower portion of the slide in which a broach carrier 7 is pivoted at 8 for swinging movements back and forth towards and away from the slide.

The upper portion of the carrier swings between side cheeks 10 of a bracket 12 which is secured to the slide 4 near its upper end. A broach or broach sections represented by B may be clamped to the carrier by clamps 14 or by any suitable means.

As the slide reciprocates in one direction, which in the embodiment of the invention shown is the downward direction, the teeth act on the work. This movement may be called the working stroke while the stroke in the opposite direction may be called the return stroke.

Broaching apparatus of the general type shown is adapted for various purposes but a particular case where it is desired to move the broach away from the work during the upstroke or return stroke is where the teeth are being formed on an internal gear. In such a case the said gear may be suitably supported in a position and disposed around the broaching apparatus and rotated in a step by step manner by some suitable means in proper timed relation to the operation of the slide so that successive teeth may be formed.

The above is merely by way of explanation since it is usually desired in broaching operations to move the work away from the broach for the return stroke of the broach.

The upper end of the broach in the present embodiment of the invention is acted upon in order to swing the broach towards and away from the work and may be accomplished in other ways, than as shown and described, with equal facility.

A cam shaft 20 is oscillatable in bracket 12 and it has a flat portion 22. The side at the upper end of the broach carrier 7 is formed to abut and ride on the cam, as shown in Figs. 2 and 3.

With the cam shaft in the position shown in Fig. 3 the broach carrier is held outwardly to hold the broach in outer working position during the downward working stroke of the slide. When the cam shaft is oscillated counter clockwise to the position of Fig. 4 the carrier and broach may swing inwardly so that the broach is moved away from the work. This occurs prior to the up or return stroke of the slide.

The carrier is urged to its return stroke position by a compression spring or springs 24 disposed in a socket 36 of the carrier and at the rear of a plate 28 secured to the bracket 12. When the cam shaft is oscillated or rotated to the non-working position of the carrier and broach, as shown in Fig. 4, the spring or springs urge the carrier clockwise against the said cam shaft 20 to the position of Fig. 4.

Various means may be employed for oscillating the cam shaft 20 but in the form of the invention shown a lever 30 on the end of the shaft has a projection 32 on its outer end for engaging with a cam or other actuating means.

A cam 34 is carried by a bracket 35 secured to the support so that as the broach approaches the limit of movement in its working stroke the projection 32 of the lever 30 brings up against the cam 34 so as to swing lever 30 clockwise whereupon the carrier 7 is free to swing so that spring 24 urges the carrier and broach clockwise. Thereby in the upward or return stroke of the slide the broach teeth pass by and are out of contact with the work being broached.

To insure movement of the broach away from the work as when spring 26 may become inoperable a stud 40 projects from the carrier 7 and extends through an opening 42 in bracket 12. This stud is so positioned with reference to the cam 34 as to engage the latter which acts thereon subsequent to the swinging of lever 30 to move the carrier clockwise in the event spring 24 fails to cause the carrier to follow the movement of the cam shaft 22.

In cases where desired means may be provided for acting on the cam shaft when the slide reaches the upper limit of its return stroke so as to insure the carrier and broach being properly positioned for the downward working stroke. To that end a lever 31 similar to lever 30 may be provided as may be a stud 41 on the side of the bracket opposite to that shown in Fig. 1. A cam similar to the cam 34 may be arranged to act on the lever and stud after the manner already described, when the slide arrives at the upper end of its stroke.

In operation it will be understood that the slide operating means will be such as to exert a pulling action thereon so that the broach acts on the work with a pulling action. By pivoting the carrier as described it is readily swung away from the work and need have but a small amount of movement to clear the work. Altogether the invention not only makes high speed operation possible but the accuracy of work is equal to if not superior to that obtained with prior art apparatus.

The novel features of the invention are adapted for various broaching operations where it is desired and necessary to move the broach away from or out of the work for the return or non-broaching stroke of said broach.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. The combination in broaching apparatus of, a support, a slide reciprocable in opposite directions therein for working and return strokes, a carrier for a broach extending longitudinally of the slide pivoted at a certain end thereto for swinging movements between outer working and inner non-working positions, said certain end of the carrier being the leading end thereof in movements of the slide in working strokes, and carrier actuating means for positioning said carrier in working position during working strokes of the slide and for positioning it in non-working position during return strokes of said slide.

2. The combination in broaching apparatus of, a support, a slide reciprocable vertically therein in a downward working stroke and an upward return stroke, a carrier for a broach extending along said slide in the direction of its movement pivoted at its lower end for swinging movements between outer and inner working and non-working positions whereby it may be in working and non-working positions during work and return strokes of the slides, and actuating means for said carrier to position the same in working and non-working positions during work and return strokes of the slide respectively.

3. The combination in broaching apparatus of, a support, a slide reciprocable vertically therein in a downward working stroke and an upward return stroke, a carrier for a broach extending along said slide in the direction of its movement pivoted at its lower end for swinging movements between outer and inner working and non-working positions whereby it may be in working and non-working positions during work and return strokes of the slides, means for releasably holding said carrier in working position during the working stroke of the slide, and means for releasing said holding means as the slide moves in its return stroke.

4. The combination in broaching apparatus of, a support, a slide vertically reciprocable therein in downward and upward working and return strokes, a carrier for a broach extending along said slide in the direction of its movement, said carrier being movable relative to said slide except for a single pivotal connection therewith at its lower end whereby said movement is confined to swinging in and out relative to said slide between outer and inner working and non-working positions in a direction transverse to the direction of movement of the slide, holding means operable relative to said slide for releasably engaging the carrier remote from said pivotal connection for holding said carrier in working position during the entire working stroke of the slide, means for actuating said holding means for the working stroke of the slide and to release the same for the return stroke thereof, and means for moving said carrier to non-working position when released by the holding means.

JOHN OAKLEY.